United States Patent
Richter et al.

(10) Patent No.: US 6,525,893 B1
(45) Date of Patent: Feb. 25, 2003

(54) MULTIPLE ORIENTATION MAGNETIC INFORMATION STORAGE

(75) Inventors: Hans J. Richter, Palo Alto, CA (US); Roger K. Malmhäll, Mountain View, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/326,155

(22) Filed: Jun. 4, 1999

Related U.S. Application Data (60) Provisional application No. 60/088,052, filed on Jun. 4, 1998.

(51) Int. Cl.$^7$ ................................................. G11B 5/09
(52) U.S. Cl. ........................................................ 360/48
(58) Field of Search ............................ 360/48, 55, 121

(56) References Cited

U.S. PATENT DOCUMENTS

| | | | | |
|---|---|---|---|---|
| 4,593,336 A | * | 6/1986 | Sansom | 360/131 |
| 5,268,800 A | * | 12/1993 | Nielsen | 360/77.01 |
| 5,995,340 A | * | 11/1999 | Ha | 360/121 |

* cited by examiner

*Primary Examiner*—Regina N. Holder
(74) *Attorney, Agent, or Firm*—Fliesler Dubb Meyer & Lovejoy LLP (57) ABSTRACT

A system for transferring information to and from a magnetic disk is disclosed wherein the information may be encoded on a data track in a large number of polarization orientations in comparison to conventional bidirectional recording schemes. In one embodiment of the present invention, it is contemplated that a single segment may be polarized in eight different orientations, each of which being distinguishable from each other by a read/write head. Polarization of a segment in one of eight different orientations significantly increases the amount of information which can be stored in any given segment relative to conventional systems which are polarized in only one of two orientations. Thus, the amount of information which may be stored on a disk may be increased without having to alter the linear or radial density of the disk.

11 Claims, 9 Drawing Sheets

MULTIPLE ORIENTATION MAGNETIC INFORMATION STORAGE

This application claims the benefit of U.S. Provisional Application No. 60/088,052 filed on Jun. 4, 1998.

BACKGROUND OF THE INVENTION

1. Field of the Invention

The present invention relates to a method of storing and retrieving data to and from a magnetic disk, and in particular to a method of storing and retrieving data to and from a magnetic disk wherein data may be encoded on a data track in a large number of polarization orientations in comparison to conventional bidirectional recording schemes.

2. Description of Related Art

Current data storage systems, such as those in computer hard disk drives, employ magnetic, optical or magneto-optical heads for recording and retrieving data to and from magnetic storage disks. Magnetic heads may include a transducer element for reading and writing the data and an air-bearing slider which supports the transducer over the disk. At present, there are three widely used head technologies in disk drives: ferrite metal in gap (MIG) technology, which uses machined ferrite ceramic cores with wire coils; inductive thin film technology; and magnetoresistive (MR) technology.

The principal elements of an inductive magnetic recording head are a magnetic core including two poles separated by a non-magnetic gap, and an electrically conductive coil wrapped or deposited in turns around the core. Data is transferred between the head and a magnetic storage disk in concentric data tracks having a radial width on the order of a few microns or less. Each track is divided into a plurality of sectors onto which the desired data is magnetically encoded. The radial track density of a given storage medium is described as a number of tracks per inch (TPI). Linear density may be described as a number of bits per inch (BPI) within a given track.

Figure 1:
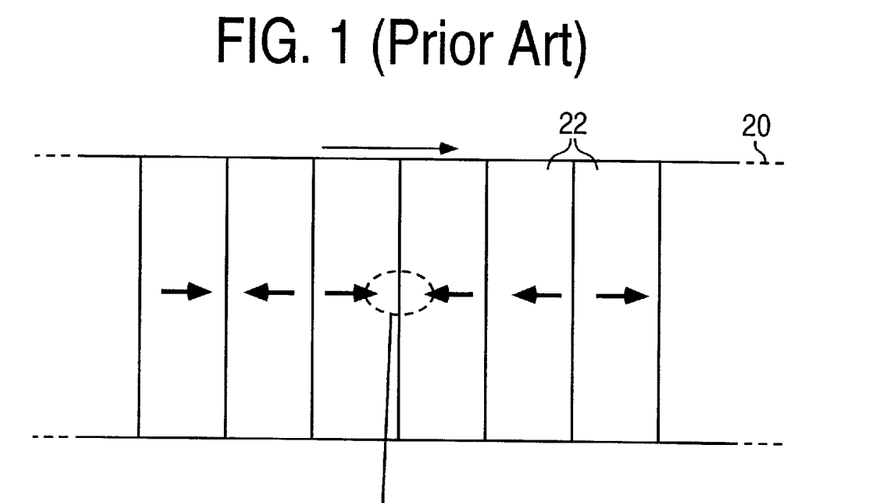
FIG. 1 is a top view of a prior art data track including a plurality of oppositely polarized segments.

To write data to a particular sector, a current is passed through the coil, thereby inducing a magnetic field in the core. The magnetic field fringes out across the gap in arcuate flux lines and, in so doing, passes into the disk to magnetize a segment of the disk. Reversing the direction of the current reverses the polarity of the next magnetized segment as it passes by the gap of the head. Thus, referring to FIGS. 1 and 2, as the magnetic disk rotates under the head, data is laid down on data tracks 20 in segments 22 of alternating magnetic polarities (indicated by oppositely facing arrows). Conventional recording systems of this kind are referred to as longitudinal recording systems, as segments on a data track are oriented either to the left (i.e., up-track) or to the right (i.e., down-track) in the plane of the disk. Alternatively, in perpendicular recording systems, it is known to provide the recording medium with an easy axis of magnetization perpendicular to the plane of the disk. Systems of this kind utilize a different transducer element and result in segments on a data track being oriented into and out of the plane of the disk.

To read data, the previously encoded disk is again passed by the head and the reversing magnetic polarities within the segments induce reversing magnetic fields in the core. These reversing magnetic fields in the core generate correspondingly reversing currents in the coil, which are sensed and decoded into binary numbers by the drive circuitry. In contrast to an inductive disk head, which is typically designed to read and write data using a single inductive element, an MR disk head uses an inductive element to write data onto the disk and a separate MR element to read data from the disk. The MR read element incorporates a magnetoresistor whose electrical resistance changes in the presence of a magnetic field. As the encoded disk is passed by the read element, the disk drive circuitry senses and decodes the changes in electrical resistance caused by the reversing magnetic polarities.

There is a constant effort in the contemporary computer field to increase the amount of information that can be stored on a magnetic disk of given size. Conventionally, this problem has been attacked by writing data in smaller segments, to thus increase linear density, and/or by decreasing the width of a data track to increase radial density.

Figure 2:
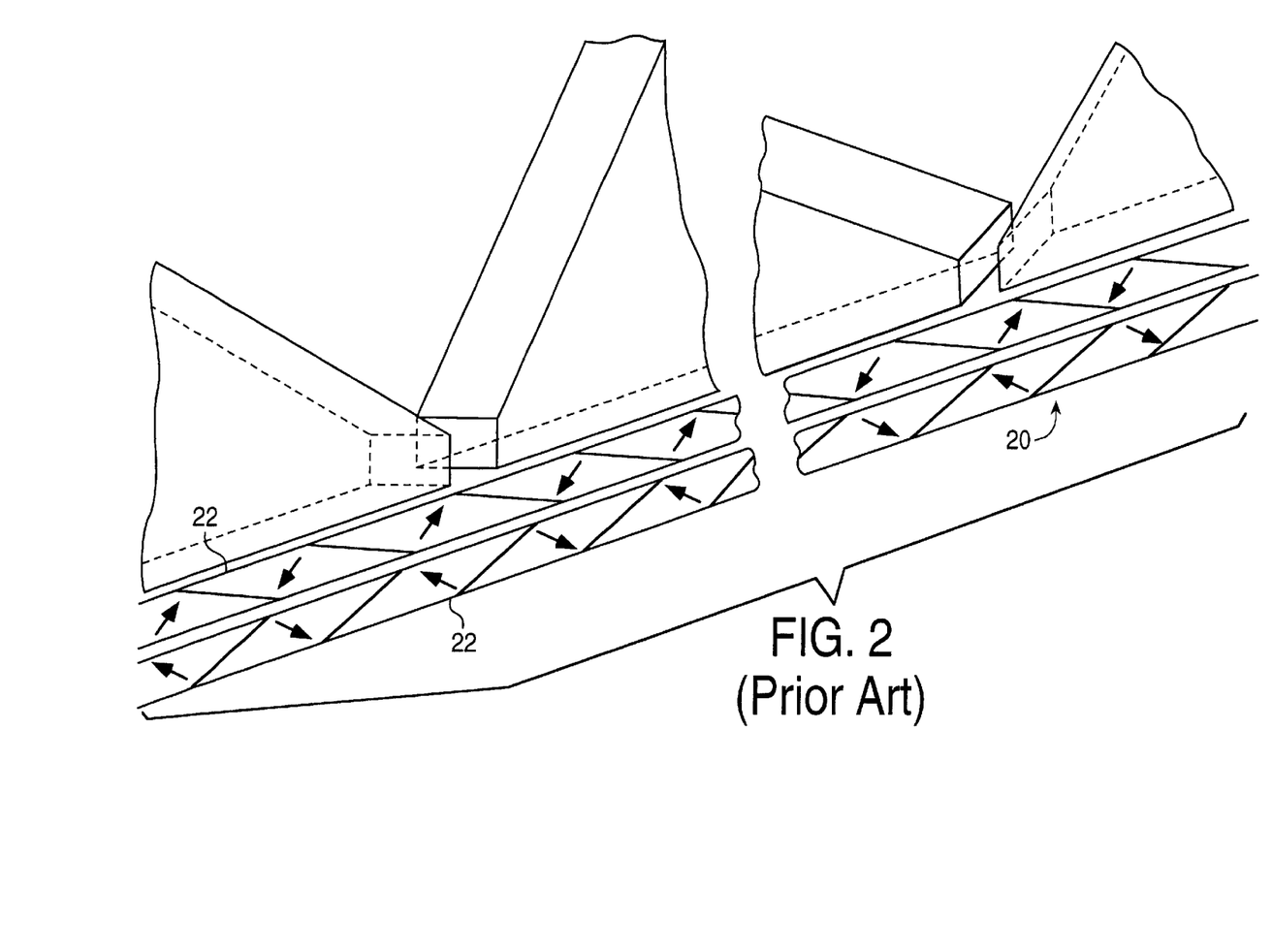
FIG. 2 is a perspective view of an azimuth recording system according to the prior art.

One method which has proved successful in increasing radial density in the magnetic tape recording industry is azimuth recording. As shown in U.S. Pat. No. 4,539,615 to Arai etal., azimuth recording utilizes "odd" and "even" transducer elements for recording "odd" and "even" data tracks, respectively, on the storage medium. In particular, as shown in FIG. 2, the gap in the odd transducer element is slanted in a first direction so as to polarize segments on one data track in a first slanted direction, and the gap in the even transducer element is slanted in a second direction so as to polarize segments on an adjacent data track in a second slanted direction. During the reading process, the even transducer element is insensitive to data on the odd data tracks, and the odd transducer element is insensitive to data on the even data tracks. In this way, the odd and even data tracks may be placed close together without a danger that data written on one track will be partially picked up by the neighboring track.

While conventional systems have attempted to increase the amount of information stored on a disk by increasing linear and radial densities, the amount of information contained in any given segment has remained unchanged. All conventional recording schemes store only a single bit (i.e., either a "0" or a "1") in a particular segment, which state is indicated by the direction of polarization of that segment. Therefore, the amount of information which is stored into and read from a particular segment is limited to only one of two possible states.

Moreover, recording data onto segments by polarizing respective segments in completely opposite directions results in certain disadvantages at the boundary, or transition, between adjacent segments. While adjacent segments are typically illustrated, as in FIGS. 1 and 2, to have a sharp transition from one polarity to the opposite, the transition in fact takes place gradually as shown in the enlarged view of the boundary region shown in FIG. 3. When the magnetic field across the gap reverses completely from one direction to the opposite direction, there will be relatively large boundary, or transition length $L_1$, which includes individual domains 24 oriented in both directions at the boundary reverse their direction gradually. The relatively large transition length $L_1$ makes it more difficult to increase the linear density within a data track.

Figure 4:
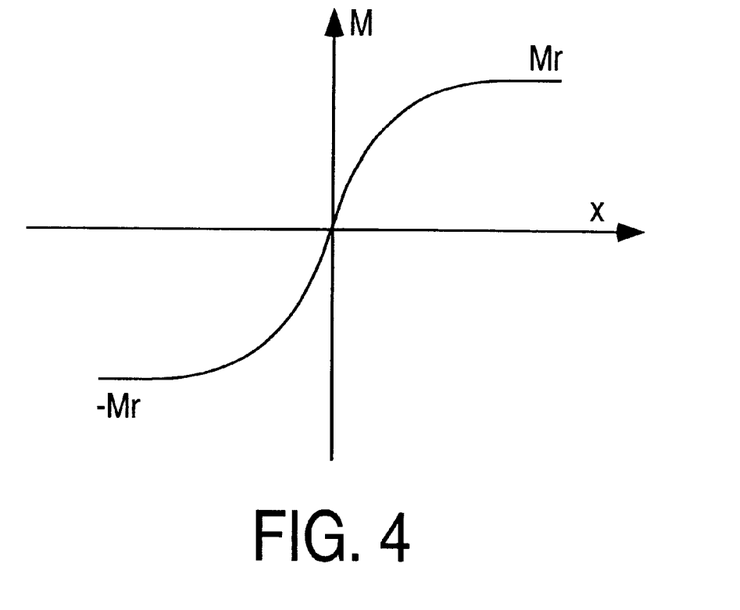
FIG. 4 is a graph showing the induced magnetization within adjacent, oppositely polarized segments on a data track.
Figure 5:
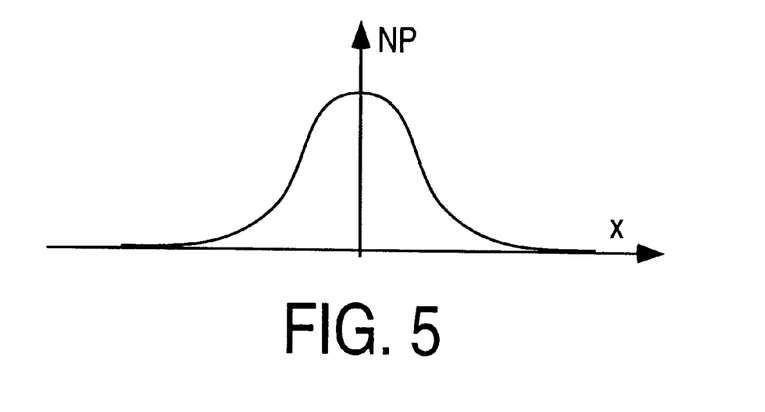
FIG. 5 is a graph of a noise power at the transition region between the segments shown in FIG. 4.

A further disadvantage to polarizing segments in opposite directions is the resultant signal-to-noise ratio (SNR) at the boundary between adjacent segments. It is known that in conventional recording schemes, the noise is concentrated at the transition between oppositely polarized segments. In particular, the media are noisiest when demagnetized, as in the center of a transition in conventional binary recording schemes (see, for example, J. C. Mallinson, *A New Theory of Recording Media Noise*, IEEE Trans. Magn., 27, pp 3519–3531, July, 1991). Noise power (NP) depends on the magnetic state as follows:

$$NP < 1 - m^2;$$

where m=the magnetization (M) induced in a segment by the gap magnetic field÷the remanent magnetization ($M_r$) of the segment. Thus, as shown on the graphs of FIGS. 4 and 5, the noise power (NP) will be at a maximum when the media is demagnetized (i.e., M=0). This state occurs each time transducing element transitions between a negatively and positively polarized segment in conventional recording schemes.

The demagnetization which occurs with each segment transition in conventional recording has another disadvantage. According to the superparamagnetic effect, magnetic media formed of small grains tend to destabilize and lose their remanent magnetism in the presence of a demagnetizing field.

SUMMARY OF THE INVENTION

It is therefore an advantage of the present invention to store more information in polarized segments on a magnetic storage disk in comparison to conventional recording systems.

It is another advantage of the present invention to magnetize a segment on a magnetic storage disk in a plurality of different polarization orientations.

It is another advantage of the present invention to reduce the length of the transition region between adjacent segments.

It is a still further advantage of the present invention to reduce the signal-to-noise ratio at the transition between adjacent segments.

It is another advantage of the present invention to increase the thermal stability of each segment by reducing the demagnetizing field at the transition between adjacent segments.

These and other advantages are presented by the present invention which in preferred embodiments relates to a method of storing and retrieving data to and from a magnetic disk wherein data may be encoded on a data track in a large number of polarization orientations in comparison to conventional bidirectional recording schemes. In one embodiment of the present invention, it is contemplated that a single segment may be polarized in eight different orientations, each of which being distinguishable from each other by a read/write head. Polarization of a segment in one of eight different orientations significantly increases the amount of information which can be stored in any given segment relative to conventional systems which are polarized in only one of two orientations. Thus, the amount of information which may be stored on a disk may be increased without having to alter the linear or radial density of the disk.

It is a further feature of the present invention that each of the possible orientations in a preferred embodiment of the present invention are directed down-track (i.e., no component of a polarization within each segment in the X direction points in opposite directions). This feature reduces the length of a boundary or transition region between two adjacent segments. Moreover, having no X-component of adjacent segments pointing in opposite directions, the signal-to-noise ratio at the transition region is reduced in comparison to conventional recorded data tracks having oppositely oriented polarized segments.

BRIEF DESCRIPTION OF THE DRAWINGS

The present invention will now be described with reference to the figures in which.

DETAILED DESCRIPTION

The present invention will now be described with reference to FIGS. 6–16 which in general relate to a system for storing and retrieving data to and from a magnetic disk wherein data may be encoded on a data track in a large number of polarization orientations in comparison to conventional bidirectional recording schemes. While the present invention is described with reference to a magnetic disk used in a Winchester-type hard disk drive, it is understood the method according to the present invention may be used to record data onto other magnetic media, such as for example floppy disks and magnetic recording tape. Additionally, it is understood that the method according to the present invention may be utilized with various head technologies including ferrite metal in gap heads, inductive thin film heads and magnetoresistive heads. It is also contemplated that the technique of the present invention may be used with optic or magneto-optic recording technologies.

Figure 6:
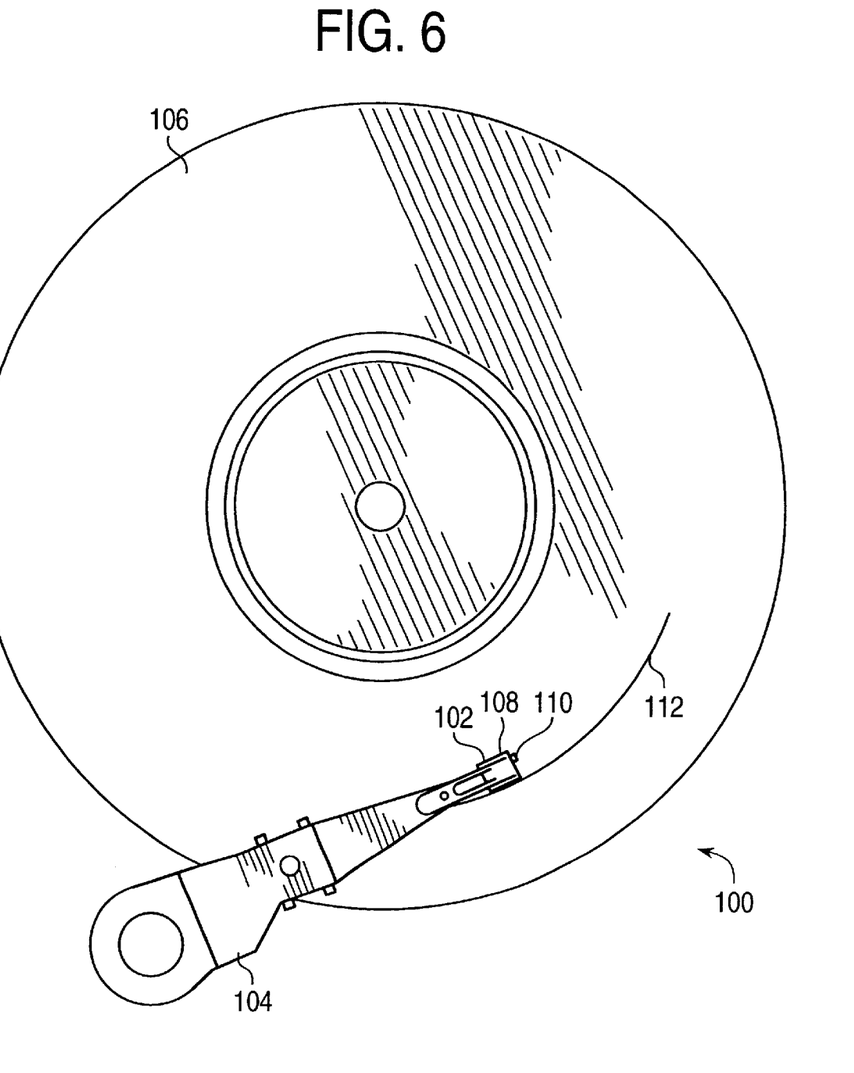
FIG. 6 is a top view of a head and disk assembly which may utilize the multidirectional recording system according to the present invention.

Referring now to FIG. 6, there is shown a top view of head and disk assembly 100 including a read/write head 102 mounted on an actuator assembly 104 over a magnetic disk 106. Head 102 includes a slider 108 affixed to the actuator assembly 104, and a transducing element 110 affixed to an end of slider 108. As is known in the art, upon rotation of disk 106, a cushion of air forces head 102 to "fly" over the disk surface so that data may be transferred between the transducing element 110 and the disk 106. Data is written to and read from a plurality of concentric data tracks 112 (a portion of one of which is shown in the figure) on disk 106.

Figure 7:
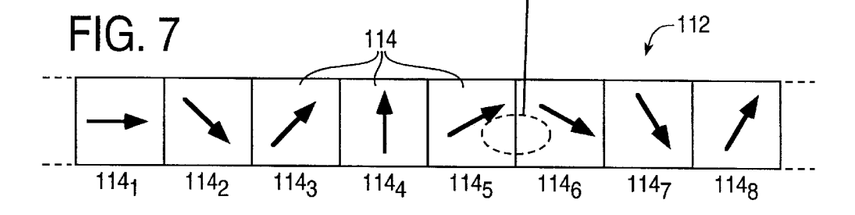
FIG. 7 is a top view of a data track recorded according to the method of the present invention including a plurality of differently oriented polarized segments.

FIG. 7 is a partial top view of a small portion of a data track 112. Information is written onto data track 12 in a plurality of contiguous segments 114 by a transducing element 110 explained in greater detail hereinafter. According to the present invention, the transducing element is capable of writing data in the plurality of contiguous segments 114 by polarizing each segment in one of a plurality of orientations. In the embodiment shown in FIG. 7, eight polarization orientations are shown. It is however understood that the number of polarization orientations may be less than eight or greater than eight in alternative embodiments. In particular, the polarization orientation of each successive segment 114 shown in FIG. 7 is as follows:

$114_1=0°$ $114_2=-45°$ $114_3=45°$ $114_4=90°$ $114_5=30°$ $114_6=-30°$ $114_7=-60°$ $114_8=60°$

The angles set forth above with respect to the polarization orientations are by way of example, and it is understood that various other polarization orientations can be written into segments 114 by transducer element 110.

As can be seen in the embodiment of in FIG. 7, each of the segments 114 can be polarized in any one of eight different orientations, with each orientation signifying a distinct and different piece of information. Thus, each segment 114 is capable of storing significantly more information in comparison to conventional binary data recording schemes where a segment is polarized in only one of two orientations. The amount, x, by which the information may be quantitatively increased within each segment 114 according to the present invention can be shown to conform to the relationship:

$$x=\log_2 n;$$

where n is the number of different polarization orientations for the particular embodiment of the invention. Therefore, for eight different polarization orientations, the amount x by which the information within a segment 114 may be quantitatively increased is:

$$x=\log_2(8) \quad x=3$$

Thus, the embodiment illustrated in FIG. 7 is capable of storing three times the data within a segment 114 than would a conventional binary recording system.

The recording method according to the present invention preferably has a lower aspect ratio in comparison to conventional recording systems. The aspect ratio refers to the ratio of a width of a data track (i.e., the dimension transverse to the direction of data track motion) relative to the length of a segment. In conventional disk drives, this ratio is approximately 20:1. In a preferred embodiment of the present invention, the aspect ratio of the recording media is approximately 1:1. The length of a polarized segment may be longer in comparison to that of conventional drives. However, as each segment according to the present invention holds more information than those in conventional recording systems, the recording system of the present invention stores more information per unit length of data track than conventional systems.

Figure 8:
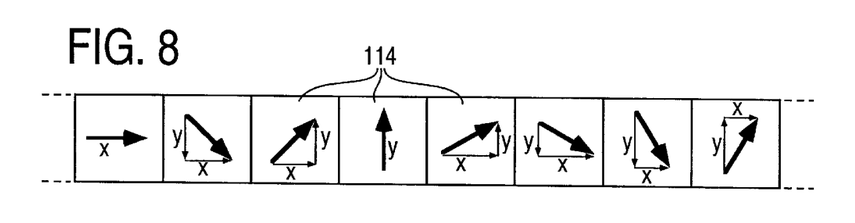
FIG. 8 is a schematic representation of the segments shown in FIG. 7 with the polarization of each segment broken down into X and Y components.

Referring now to FIG. 8, each of the segments 114 has a polarization orientation which may be broken down into an X-component parallel to the direction of data track movement and a Y-component transverse to the direction of data track movement. In a preferred embodiment of the present invention, no X-component of the polarization orientation of any given segment 114 is opposite that of any other segment 114. With the exception of a segment polarized to 90° (as in $114_4$), the X-component of each segment preferably faces in the same direction. In the embodiment shown in FIG. 7, each of the segments (with the exception of $114_4$) has an X-component that faces down-track. It is understood that each of the segments may face up-track in alternative embodiments.

Figure 3:
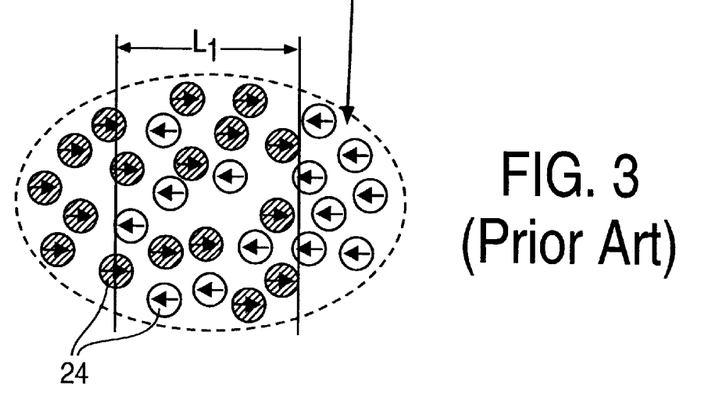
FIG. 3 is an enlarged partial view of a boundary region of a prior art magnetic disk showing oppositely polarized domains.
Figure 9:
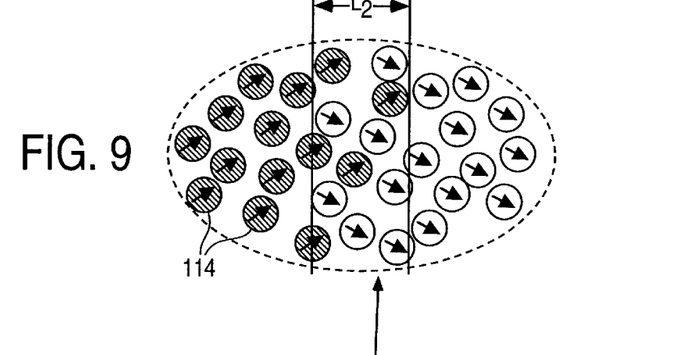
FIG. 9 is an enlarged partial view of a transition region between adjacent segments of a magnetic disk recorded according to the method of the present invention.

As explained in the Background of the invention section, where adjacent segments are polarized in completely opposite directions, as is conventional, the polarity or induced magnetism M must completely reverse itself as the head transitions from one segment to the next. This transition must occur gradually, and as shown in FIG. 3 and discussed above, results in a relatively large transition length $L_1$. However, in the recording system of the present invention, as none of the polarization orientations have X-components facing opposite to each other, a transition from one segment to the next never involves a complete reversal of the polarity. Thus, as shown in FIG. 9, there is a relative small transition length, $L_2$ where the domains 116 have mixed polarities.

Another advantage to the recording system according to the present invention is that the disk media is not completely demagnetized when transitioning from one segment to the next. In particular, because adjacent segments will generally have X-components pointing in the same direction, the polarization or induced magnetization within the media will generally not pass through a state where the magnetization goes to zero (where noise is at a maximum) in the transition region between adjacent segments. Thus, noise power NP is reduced and signal to noise ratio is improved relative to conventional recording schemes, which as discussed, involve a demagnetization when transitioning between segments.

A further advantage relating to the fact that the medium in the present invention is not completely demagnetized when transitioning from one segment to the next is that the segments are more thermally stable. As indicated by the superparamagnetic effect, domains within conventional systems are more likely to destabilize in comparison to those of the present invention owing to the relatively stronger demagnetizing fields which occur in conventional recording systems.

Although each of the segments have X-components of polarization facing in the same direction in a preferred embodiment, it is understood that the segments maybe polarized to include oppositely facing X-components in alternative embodiments. While such embodiments may have wider transition regions between adjacent segments, each segment will contain more information relative to conventional binary recording systems. In a further alternative embodiment of the present invention, it is contemplated that a segment can have two polarization orientations having at least an X-component facing in the same direction. While such embodiments will be able to store only two states within each segment, the transition region between adjacent segments will be reduced relative to conventional binary recording systems.

Figure 10:
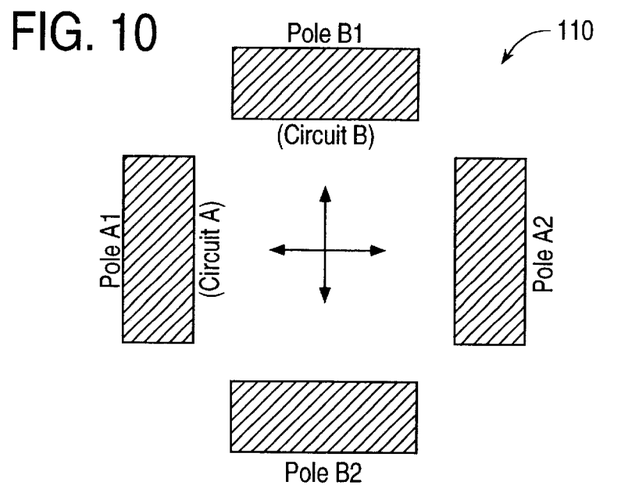
FIG. 10 is a schematic representation of transducer elements capable of polarizing a segment in any one of the desired orientations during a write process.
Figure 11:
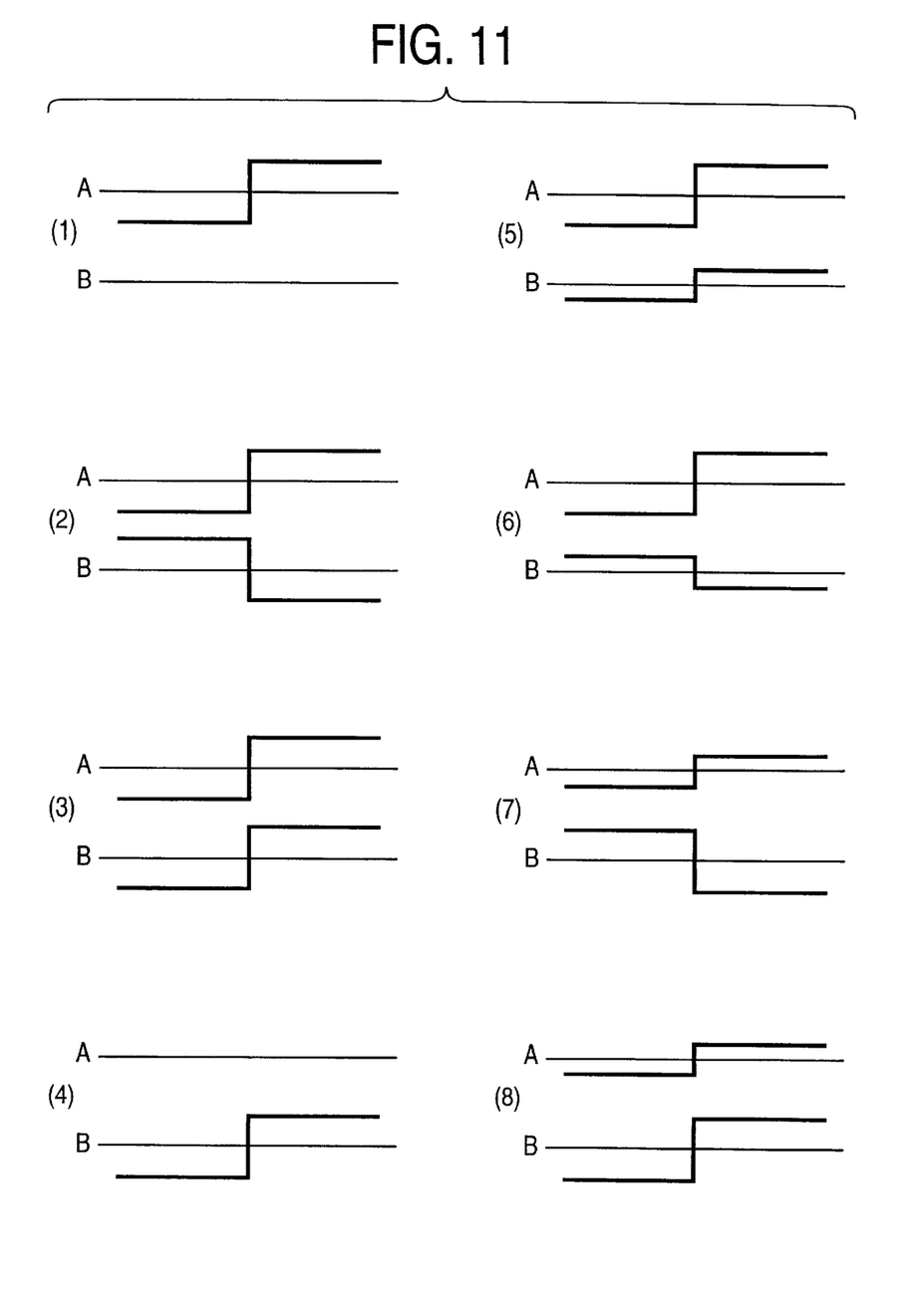
FIG. 11 is a graphic illustration of the current to be provided through the transducing elements shown in FIG. 10 for creating each of the segments shown in FIG. 7.

A transducer 110 for writing information onto the segments 114 will now be described with reference to FIGS. 10 and 11. In order to write segments in the plurality of orientations shown in FIG. 7, it is necessary to employ at least two magnetic circuits. FIG. 10 illustrates two magnetic circuits A and B, each including a pair of poles A1, A2 and B1, B2. Although not shown, the magnetic circuits further include electrical coils associated therewith for generating magnetic fields that extend between poles A1, A2 and B1, B2. As would be appreciated by those of skill in the art, the various polarization orientations may be created in segments 114 by varying the amplitude and/or direction of the current through the magnetic circuit coils. In particular, FIG. 11 illustrates the current to be passed through magnetic circuits A and B to create the various polarization orientations shown in FIG. 7. Graphs (1) through (8) correspond to segments $114_1$ through $114_8$, respectively. Thus, for example, current through circuits A and B as indicated in FIG. 11(2) will result in a magnetic field which polarizes segment $114_2$ as shown in FIG. 7. By varying the current in one circuit relative to the other circuit, one circuit will have a greater effect in establishing the resultant magnetic field. For example, in FIG. 11(6), the current through circuit A is stronger than the current through circuit B. Thus, the resultant magnetic field and polarization orientation is more closely aligned with an axis between poles A1, A2 than an axis between poles B1, B2.

Figure 12:
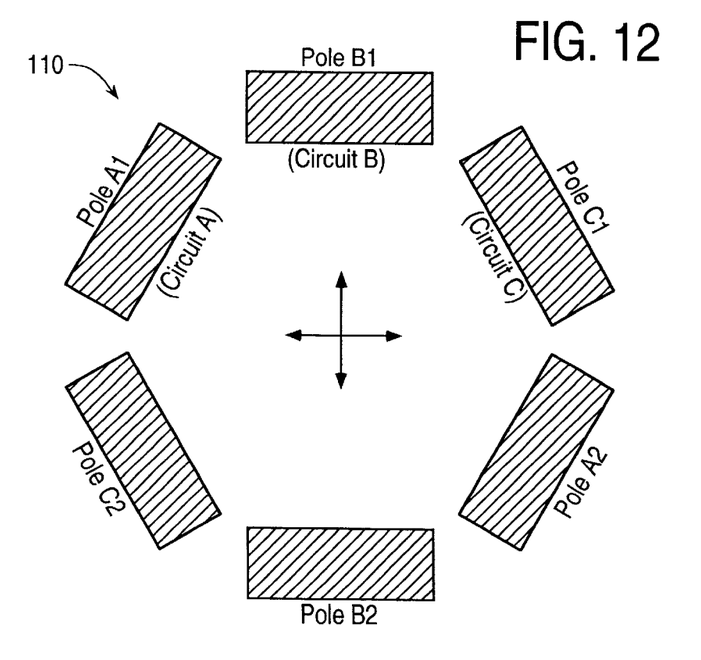
FIGS. 12 and 13 are schematic representations of transducer elements capable of polarizing a segment in any one of the desired orientations during a write process according to alternative embodiments of the present invention.
Figure 13:
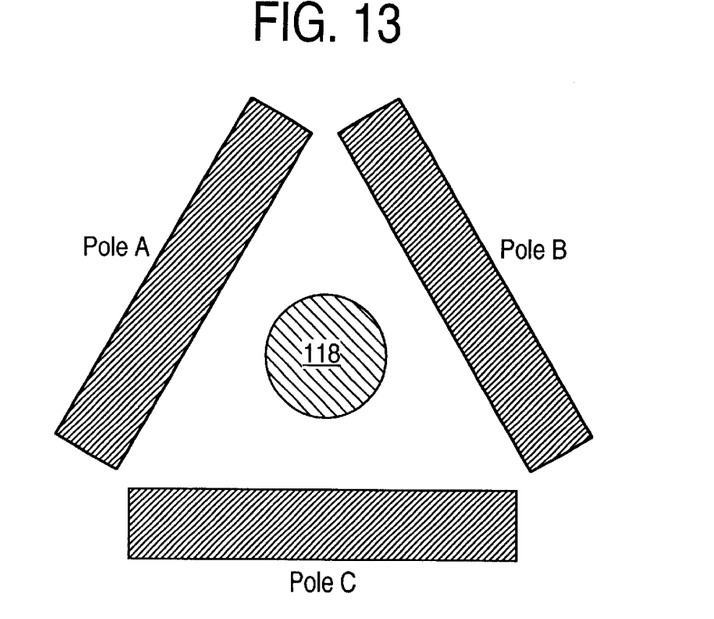

It is understood that the number of magnetic circuits utilized may vary in alternative embodiments. For example, FIG. 12 illustrates three magnetic circuits A, B and C including six poles capable of generating a plurality of polarization orientations in segments 114, depending on the amplitude and/or current through the respective circuits. The smallest number of poles which may be used to create the plurality of polarization orientations is three, as shown in FIG. 13. Additionally, it is understood that the orientation of the magnetic circuit core elements, with respect to both each other and the data tracks 112 over which they pass, may vary in alternative embodiments.

FIG. 13 also schematically illustrates the known technique of thermally assisted recording. Where a disk has been fabricated to possess certain magnetic properties, the application of heat, as by a laser, to an area 118 on the disk being written will lower the coercivity of the heated area. Lowering the coercivity allows the segments to be polarized under a smaller applied magnetic field. According to an embodiment of the present invention, the areas surrounding area 118 are not heated, and as such do not receive sufficient applied magnetic field to become polarized. Thus, the laser in this embodiment may be controllably used along with the magnetic circuits to define the width of the data tracks polarized by the write head. It is understood that the technique of thermally assisted recording as described above may be used with any of the transducer 110 configurations described above.

Figure 14:
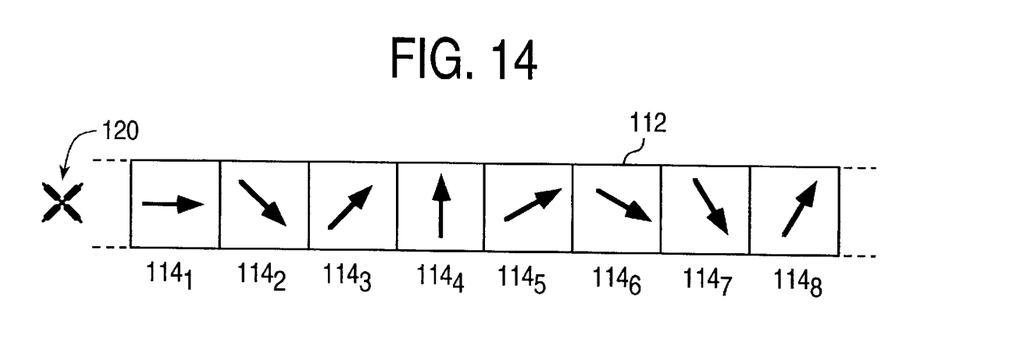
FIGS. 14, 15 and 16 are schematic representations of three configurations of magnetoresistive elements for reading the information contained within each of the segments recorded according to the method of the present invention.

A read element for reading the information written in segments 114 will now be described with reference to FIGS. 14 and 15. A read element assembly 120 is provided including a plurality of unidirectionally sensitive read elements mounted at an angle with respect to each other. The read elements may be magnetoresistive transducers, but it is understood that other read elements, such as inductive transducers, may be utilized. Where inductive transducers are utilized, the same elements used to write information to the segments 114 may be used to read the information. It is also contemplated that the technique of the present invention may be used with optic or magneto-optic recording technologies by using the longitudinal kerr effect readout.

The polarization orientation within a segment will generate a magnetic field which will affect the individual read elements of the assembly 120 differently, depending on the relative orientation of the segment polarization to the elements of the assembly. Thus, referring to FIG. 14, the first pair of read elements are able to sense a first component of the magnetic field emanating from the segment 114, and the second pair of read elements are able to sense a second component of the magnetic field emanating from the segment 114. The intensity and direction of the respective components detected by the read elements may then be interpreted to determine orientation of the magnetic field in the segment 114. Thus, each polarization orientation may be distinguished and identified by the read element assembly. It is contemplated that the assembly 120 may include four individual read elements (FIG. 14), or two individual read elements (FIG. 15). It is understood that various other numbers of read elements may be used, and that the orientation of the read elements with respect to both each other and the data tracks 112 over which they pass may vary in alternative embodiments.

Figure 15:
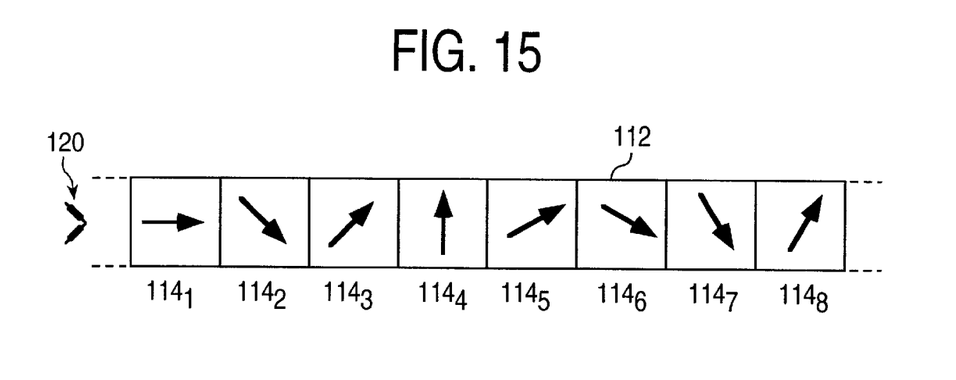
Figure 16:
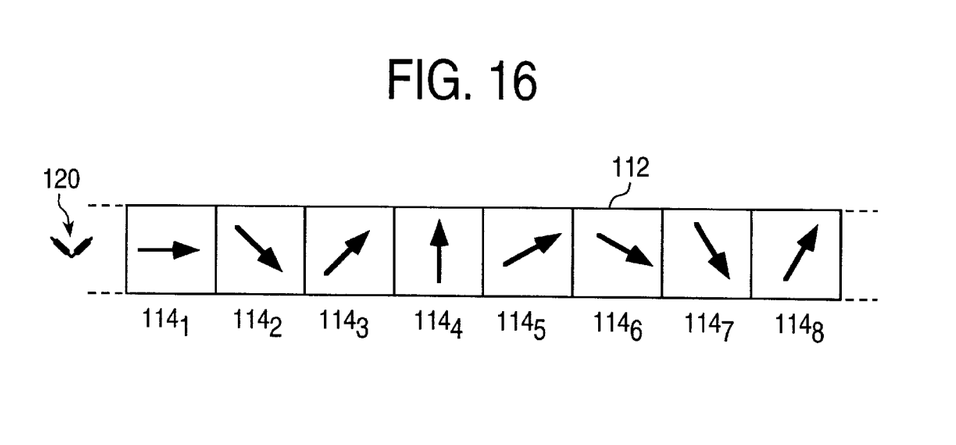

The read assembly 120 shown in FIG. 16 is identical to that shown in FIG. 15, but is rotated 90°, for example, from that shown in FIG. 15. Rotating the assembly as show results in one of the read elements, i.e., element $120_1$, sensing a particular point over a segment before the other read element $120_2$. The control circuit may however apply a clock delay to element $120_2$ so that it appears that the two elements are in effect sensing the same point at the same time.

Although beyond the scope of the present invention, it is understood that the machine language used by the disk drive control circuitry would be tailored to transfer information to and from the magnetic disk according to the number of polarization orientations utilized in that particular embodiment. In particular, where eight possible polarization orientations are used, the machine language would operate with number is base 8.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. A method of encoding information in a plurality of polarization orientations within a data track on a magnetic disk of a hard disk drive using a single transducer element composed of a plurality of magnetic circuits on a read/write head to reduce a transition boundary between adjacent segments, comprising the steps of:

(a) polarizing a first segment on the data track in a first orientation, the first orientation having an X component and a Y component and the firs orientation being uniquely indicative of a first item of information, by the step of:

(1) applying a current to a first magnetic circuit of said plurality of magnetic circuits of the single transducer element to induce a magnetic field in said first segment of said data track, (b) polarizing a second segment on the data track adjacent to the first segment in a second orientation the second orientation having an X component which does not oppose the X component of said first orientation, and said second orientation being uniquely indicative of a second item of information by the step of:

(1) applying a current to a second magnetic circuit of said plurality of magnetic circuits of said single transducer element to induce a magnetic field in said second segment of said data track whose polarization is not parallel to that of said first segment.

2. A read/write head for recording data to and retrieving data from a storage media of a hard disk with a reduced transition boundary between adjacent segments of the storage media, comprising:

means for encoding information in a plurality of polarization orientations within a segment of a data track on a magnetic disk of a hard disk;

said means including a transducer element affixed to said read/write head including a plurality of magnetic circuits, each magnetic circuit of said plurality of magnetic circuits capable of recording data to said storage media in a different polarization orientation, each polarization including an X component and a Y component, such that X components of adjacent segments are other than opposing.

3. A transducer element that records data with a reduced transition boundary between adjacent segments of a storage medium, comprising:

a plurality of magnetic circuits, each magnetic circuit of said plurality of magnetic circuits capable of magnetizing a segment of the data track in a distinct orientation such that adjacent magnetized segments are magnetized having magnetization orientations such that the X components of the magnetization orientations of adjacent segments are other than opposing.

4. The transducer of claim 3, wherein said transducer element includes at least two magnetic circuits, each said magnetic circuit including a pair of magnetic poles and a pair of associated electrical coils.

5. The transducer of claim 4, each said magnetic circuit is oriented having a specified degree of separation from adjacent magnetic circuits of said plurality of magnetic circuits.

6. A method of reducing a transition boundary region between adjacent segments of a magnetic storage medium comprising the steps of:

polarizing a first segment of a magnetic storage medium in a first orientation, said first orientation having an X component and a Y component; and polarizing a second segment of a magnetic storage medium in a second orientation, said second orientation having an X component that does not oppose said X component of said first orientation.

7. The method of claim 6, wherein said step of polarizing a first segment comprises the step of:

applying a current to induce a magnetic field in said first segment of said magnetic medium.

8. The method of claim 7, wherein said step of polarizing a second segment comprises the step of:

applying a current to induce a magnetic field in said second segment of said magnetic medium.

9. A method of storing data on a magnetic storage medium to reduce data degradation effects comprising the steps of:

polarizing a first segment of a magnetic storage medium in a first orientation, said first orientation having an X component and a Y component; and polarizing a second segment of a magnetic storage medium in a second orientation, said second orientation having an X component that is substantially parallel to said X component of said first orientation wherein said X component of said second orientation does not oppose said X component of said first orientation.

10. The method described in claim 9, wherein said step of polarizing said first segment comprises the step of:

applying a current to a first magnetic circuit of a plurality of magnetic circuits of a single transducer element to induce a magnetic field in said magnetic medium.

11. The method described in claim 10, where in said step of polarizing a second segment comprises the step of:

applying a current to a second magnetic circuit of said plurality of magnetic circuits of said single transducer element to induce a magnetic field in said second segment of said magnetic medium.

* * * * *